G. R. KIDDER,

Assignor, by mesne assignments, to himself, A. D. TAYLOR & B. J. FLUMERFELT.

Sliding-Door.

No. 8,789. Reissued July 8, 1879.

Attest:
A. Barthel
Theo. S. Day

Inventor:
G. R. Kidder
By Atty
Thos. S. Sprague

N. PETERS, PHOTO-LITHOGRAPHER, WASHINGTON, D. C.

UNITED STATES PATENT OFFICE.

GEORGE R. KIDDER, OF ARMADA, MICHIGAN, ASSIGNOR, BY MESNE ASSIGNMENTS, TO HIMSELF, ADRIAN D. TAYLOR, AND BYRON J. FLUMERFELT.

IMPROVEMENT IN SLIDING DOORS.

Specification forming part of Letters Patent No. 203,051, dated April 30, 1878; Reissue No. 8,789, dated July 8, 1879; application filed June 5, 1879.

*To all whom it may concern:*

Be it known that I, GEORGE R. KIDDER, of Armada, in the county of Macomb and State of Michigan, have invented certain new and useful Improvements in Sliding Doors; and I do hereby declare that the following is a full, clear, and exact description of the invention, which will enable others skilled in the art to which it appertains to make and use the same, reference being had to the accompanying drawings, which form a part of this specification.

Figure 1:
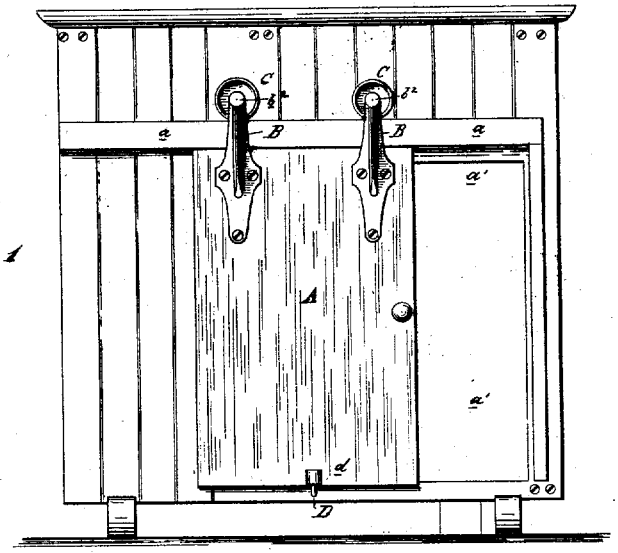
Figure 3:
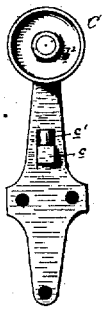
Figure 2:
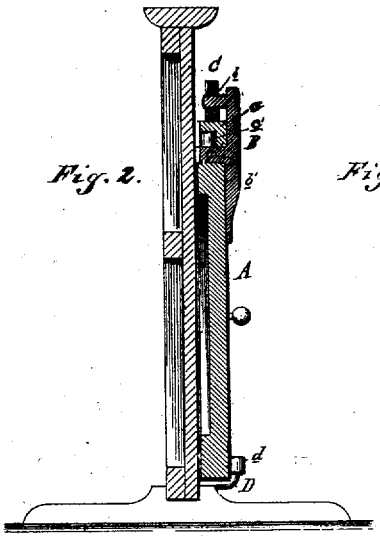
Figure 4:
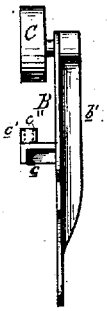

Figure 1 is a front view of my improved sliding door or gate. Fig. 2 is an end view with one of the pulleys in section. Figs. 3 and 4 are detached views.

This invention appertains to certain improvements in sliding doors or gates, and has reference particularly to hanging and guiding the door or gate, by which the latter is caused to run more easily and with less friction, and the opening and closing of the same thus facilitated.

The nature of this invention consists in the peculiar construction of the hangers to which the pulleys are attached, and by which the door or gate is hung, and in the combination therewith, for guiding the door or gate, of a bent bar or support having a frictional roller arranged in contact with said door or gate, substantially as hereinafter more fully set forth.

In the annexed drawings, A marks a door or gate hung or suspended from an elevated platform, *a*, extending over the gateway or opening *a'* by means of hangers B B. These hangers are suitably fastened to the door or gate A, and provided with right-angled arms *b*, which serve as axes for the pulleys C C, traveling upon the platform *a*. The point of attachment of each arm or axis to a hanger is strengthened or re-enforced by a web or rib, $b^1$, cast or formed therewith. Upon the axis *b*, on each side of the pulleys C, are ears or disks $b^2$, one of each pair of which may be removable, to permit of a broken or impaired pulley being replaced by a new or perfect one. Cast or otherwise formed with the hangers B B are brackets *c*, having upwardly-projecting studs or projections *c'*, having a frictional roller, *c''*, thereon, which extend up behind the depending portion of the platform *a*, to hold the upper part of the gate or door and its pulleys in position.

D is a bent or angular bar fastened beneath the door or gate A, and extending up alongside thereof, which extension is provided with a frictional roller, *d*, arranged closely to or in contact with the door or gate, to guide the latter in its movement, to enable it to run more easily and with less friction, thereby facilitating the opening and closing of the same.

In addition to possessing the above-enumerated advantages, my invention is also exceedingly simple, inexpensive, and easily constructed.

What I claim as my invention, and desire to secure by Letters Patent, is—

1. A door or gate hanger composed of a bracket adapted to be secured to the face of a door, which bracket has an arm upon which is pivoted a flat-faced roller which supports and carries the door, and has also an arm with a guide or roller adapted, in connection with a suitable guide, to prevent the door from displacement in any direction, substantially as described.

2. In combination with a hanger provided with a vertical bearing-wheel and a guide, the platform or plate *a*, provided with a groove upon its lower face to receive the guide, substantially as described.

3. A hanging for a sliding door or gate, consisting of a bearing-roller, C, secured to a bracket, as described, and a stop or guide, *c'* *c''*, combined with the angular bar D, provided with a frictional roller, *d*, substantially as and for the purpose set forth.

GEORGE R. KIDDER.

Witnesses:

H. S. SPRAGUE,

A. BARTHEL.